United States Patent [19]

Miffre

[11] 3,954,138
[45] May 4, 1976

[54] SAFETY PLUG FOR SEALING-OFF THE TUBING OF A PRODUCING OIL OR GAS WELL

[75] Inventor: Hubert Miffre, Elancourt, France

[73] Assignee: Entreprise de Recherches et d'Activities Petrolieres Elf, Paris, France

[22] Filed: Nov. 12, 1974

[21] Appl. No.: 523,372

[30] Foreign Application Priority Data
Nov. 14, 1973 France .............................. 73.40469

[52] U.S. Cl. ............................ 166/188; 137/68 R; 166/224 A
[51] Int. Cl.² ................... E21B 33/12; E21B 43/12; F16K 17/36
[58] Field of Search ................ 166/133, 188, 224 R, 166/224 A; 137/68 R, 68 A, 71, 70, 69

[56] References Cited
UNITED STATES PATENTS

| | | | |
|---|---|---|---|
| 1,839,861 | 1/1932 | Baker | 166/133 |
| 2,342,367 | 2/1944 | Pryor | 137/68 |
| 2,656,151 | 10/1953 | Miller | 166/133 |
| 2,919,709 | 1/1960 | Schwegman | 137/68 |
| 3,250,331 | 5/1966 | Boyle | 166/133 |
| 3,735,813 | 5/1973 | Mack et al. | 166/188 |
| 3,794,057 | 2/1974 | Badger | 137/68 R |

*Primary Examiner*—Ernest R. Purser
*Attorney, Agent, or Firm*—Lane, Aitken, Dunner & Ziems

[57] ABSTRACT

A safety plug for sealing-off the tubing in a deep producing well comprises a body fitted within the tubing by means of O-ring seals, an axial valve having two heads in opposition which are capable of being applied against top and bottom seatings of the body, and an axial push-rod unit connected to the valve. The push-rod unit as well as the valve are positioned with respect to the body and with respect to the top and bottom seatings by means of shearing-pins, a spring being placed between the valve and the lower end of the body.

5 Claims, 1 Drawing Figure

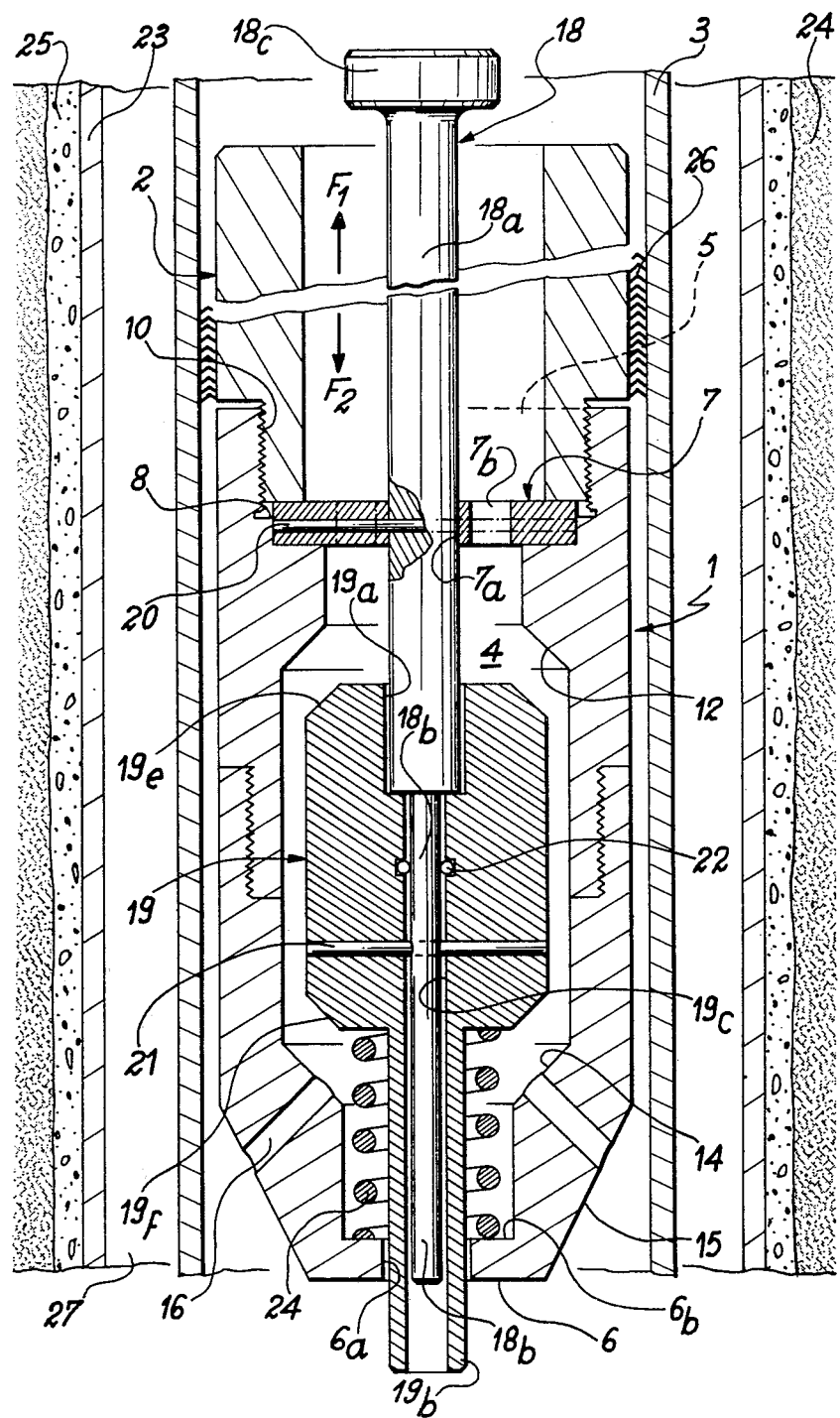

SAFETY PLUG FOR SEALING-OFF THE TUBING OF A PRODUCING OIL OR GAS WELL

This invention relates to safety plugs for sealing-off a producing oil or gas well during operation according to the direction of flow of formation effluents.

It will be recalled that in an equipped oil well, there are two coaxial steel tubes separated by an annular space. The outer tube or so-called "casing" is in contact with the formation or with an intermediate layer of cement; the inner tube or so-called "tubing" contains the oil during production and the various tools required in the event of remedial action within the well. The annular space permits return circulation of drilling muds and maintenance of equilibrium between the surface pressure and the hydrostatic pressure at the bottom of the bore hole.

The aim of this invention is to provide a plug which is controlled from the surface and is capable of stopping the flow of formation effluents in both directions.

To this end, the plug under consideration is characterized in that it comprises:
a body fitted within said tubing by means of O-ring seals and containing an axial valve having two heads in opposition which are applicable against top and bottom seatings of said body;
an axial push-rod unit connected to the valve and essentially provided with shearable members for positioning the push-rod unit as well as the valve with respect to the plug body and with respect to the top and bottom seatings;
an expansion member placed between the valve and the lower end of the body.

By virtue of this important characteristic feature of the invention, namely the two valve heads and the shearable locking-pins, an impact or a tractive force applied to the valve head results in rapid closure of the central tube which is connected to the main body whilst the streams of formation effluents take part in said closure.

The head can be actuated from the surface either by attachment of a line or as a result of an impact produced by a ballast weight.

In one advantageous embodiment of the invention, the shearable members comprise two radial locking-pins so arranged that one locking-pin passes through the body and the push-rod unit above the top seating and the other locking-pin passes through the push-rod unit as well as the valve which is positioned at equal distances between said seatings.

In another embodiment of the invention, the valve has an extension in the form of a tube slidably mounted within a portion of the lower end of the body, said tube being intended to serve as a guide for the expansion member and for the operating stem of the push-rod unit.

In a further embodiment the operating stem of the push-rod unit terminates in a head which projects beyond the top end of the body. The expansion member is a helical spring.

One form of construction of the plug in accordance with the invention is illustrated diagrammatically in the single accompanying FIGURE which is given by way of example and not in any limiting sense.

In this FIGURE, the plug 1 in accordance with the invention is rigidly fixed to a tool-holder 2 mounted within a compartment located for example at the bottom end of an inner tube 3 or tubing string.

It will be noted that the outer steel tube 23 or casing string is maintained in the formation 24 by means of an intermediate layer 25 of cement. Fluid-tightness between the plug 1 and the tubing string 3 is ensured by means of suitable O-ring seals 26.

An annular space 27 is left between the tubing 3 and the casing 23 in order to permit the return flow of drilling muds and the maintenance of equilibrium between the surface pressure and the hydrostatic pressure at the bottom of the well bore.

The plug 1 is formed by an internal chamber having an open end portion 5 and a closed end portion 6. The open end portion is equipped with an end-plate 7 having bores 7b and centered on an annular shoulder 8 formed at the bottom of the internally-threaded connection which is machined in the body 1 and which serves to screw this latter onto the tool-holder 2.

The chamber 4 has two seatings 12 and 14 respectively which are in opposition and adjacent to the end portions 5 and 6. The seating 14 communicates with the exterior of the body 1 through lateral ducts 16 which are adjacent to the closed end portion 6. In order to ensure that the ducts 16 have free access to the exterior, these latter have their openings in the lower end of the main body 1 which is machined so as to form a frusto-conical portion 15.

A push-rod unit 18 and a valve 19 are mounted so as to slide one inside the other within the interior of the main body 1 and concentrically with this latter.

In the example shown in the FIGURE, the operating stem 18a of the push-rod unit 18 consists of two stages: one stage 18a of the operating stem is slidably mounted both within a bore 7a of the end-plate 7 and within the valve bore 19a which has the same diameter; the other stage 18b has a smaller diameter and is slidably mounted within the bore 19c of a guide tube 19b which forms an extension of the valve 19. The guide tube 19b also slides within a cylindrical bearing surface 6a formed by the bore of the closed end portion 6.

The push-rod unit 18 extends beyond the top end of the plug 1 above the end-plate 7 and terminates in a head 18c having the shape of an anvil, the design function of which will be explained in greater detail hereinafter.

The push-rod unit 18 is rigidly fixed with respect to the main body 1 by means of a radial locking-pin 20 fitted within the thickness of the end-plate 7. The valve 19 is rigidly fixed with respect to the push-rod unit 18 by means of another radial locking-pin 21 which is passed through said valve 19.

The radial locking-pins 20 and 21 are shearable along the interface between stage 18a and bore 7a and also along the interface between stage 18b and bore 19c. The locking-pins can have similar or different shearing-strength characteristics without thereby modifying the scope of the invention.

Internal fluid-tightness between the bore 19c and the stage 18b of the push-rod unit 19 is ensured by means of an O-ring seal 22. No special provision is made for fluid-tightness of the bore 6a by reason of the principle of operation of the valve within the plug.

A helical spring 24 is interposed and compressed between the bottom head 19f of the valve 19 and the bottom end-wall 6b of the closed end portion 6.

In the rest position and as illustrated in the FIGURE, the bearing surfaces of the heads 19e and 19f of the valve are maintained at equal distances from the corresponding bearing surfaces of the seatings 12 and 14 by the respective position locations of the locking-pins 20 and 21.

The operation of the plug is as follows: when the formation effluents flow upwards within the tubing 3, said effluents pass through the lateral ducts 16, the chamber 4, and are discharged through the bores 7b towards the interior of the tool-holder 2.

When the pressure of said effluents exceeds a given threshold value, the force exerted on the head 19f of the valve 19 can be sufficient to shear the top locking-pin 20; the spring 24 then expands and accordingly applies the head 19e against the top seating 12.

Shearing of the locking-pin can also be initiated from the surface by applying a tractive force on the head 18c (in the direction of the arrow $F_1$) by means of a line (not shown) which is attached to this latter or alternatively by subjecting said head 18c to a violent impact by means of a ballast weight released within the tool-holder 2.

When said ballast weight (not shown in the FIGURE) is continuously applied at the end of a line against the head 18c, the bottom head 19f of the valve can accordingly be applied against the seating 14 (in the direction of the arrow $F_2$), thus stopping the flow of effluents within the plug 1.

A larger tractive force on the head 18c has the effect of shearing the locking-pin 21 and of establishing a communication between the top and bottom ends of the valve 19, thus providing a free passage within the plug as a function of the equilibrium of pressures on the two heads 19e, 19f of the valve 19.

We claim:
1. A safety plug for sealing-off the tubing in a deep producing well in which said plug comprises a body fitted in position by means of O-ring seals within said tubing and contains an axial valve having two heads in opposition which are capable of being applied against the top and bottom seatings of the body, and an axial push-rod unit being connected to the valve, wherein said plug comprises shearable members for positioning the push-rod unit as well as the valve with respect to the body and with respect to the top and bottom seatings, said shearable members comprising two radial locking-pins so arranged that one locking-pin passes through the body and the push-rod unit above the top seating and the other locking-pin passes through the push-rod unit as well as the valve which is positioned at equal distances between said seatings, and an expansion member placed between said valve and the lower end of said body.

2. A safety plug for sealing-off the tubing in a deep producing well in which said plug comprises a body fitted in position by means of O-ring seals within said tubing and contains an axial valve having two heads in opposition which are capable of being applied against the top and bottom seatings of the body, and an axial push-rod unit being connected to the valve, wherein said plug comprises shearable members for positioning the push-rod unit as well as the valve with respect to the body and with respect to the top and bottom seatings, an expansion member placed between said valve and the lower end of said body, said valve having an extension in the form of a tube slidably mounted within a portion of the lower end of the body, said tube being intended to serve as a guide for the expansion member and for the operating stem of the push-rod unit.

3. A safety plug for tubing in a deep producing well, comprising a body fitted within said tubing and defining an upper valve seat, a lower valve seat, and a through passage for the flow of fluid from said well, an axial valve disposed in said body and having two heads at opposite ends thereof which are normally positioned in a spaced relation to said upper and lower valve seat, respectively, to permit the flow of fluid through said body, said valve being movable relative to said body to positions in which said heads engage their corresponding seats to prevent the flow of fluid through said body, a push rod unit attached to said valve, a plurality of shear pins connecting said push rod unit to said body in a position where said heads are in said normal position, said shear pins adapted to release said valve in response to a predetermined fluid pressure in said body or in response to a predetermined manual force on said push rod unit, and means extending between said valve and said body to urge one of said heads into engagement with its corresponding seat in response to said release of said securing means.

4. A plug according to claim 3 wherein said push rod unit is connected to said valve by a plurality of shear pins.

5. A plug according to claim 4 wherein said push rod unit extends within a through bore in said valve and wherein the shear pins connecting said push rod unit to said valve are adapted to shear in response to a force greater than the force required to shear the pins connecting said push rod unit to said body to permit release of said push rod unit from said valve and the flow of fluid through said bore despite the engagement of said one head with its corresponding seat.

* * * * *